(No Model.)
H. S. DAVIDS.
BENT LEVER SCALE.
No. 313,477. Patented Mar. 10, 1885.
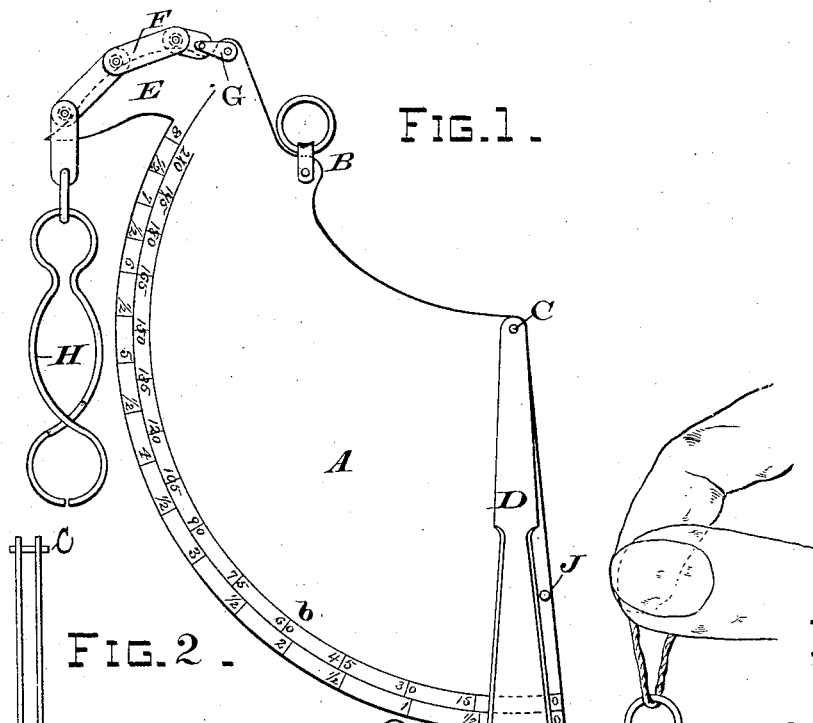
Fig. 1.
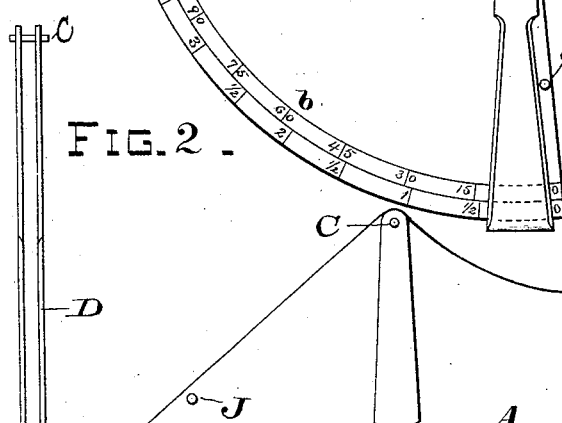
Fig. 2.
Fig. 3.
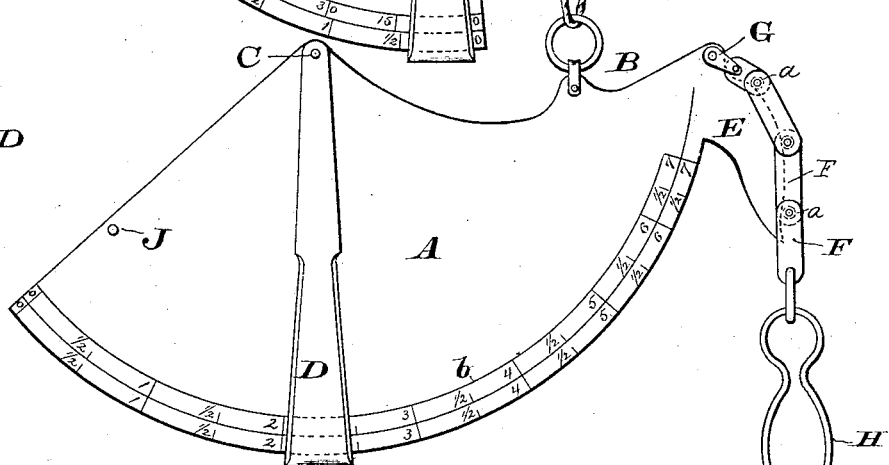
Fig. 4.
WITNESSES
Wilmer Bradford
F. J. Newbery.
INVENTOR
Henry S. Davids
per Geo. Pardy
Atty

UNITED STATES PATENT OFFICE.

HENRY STEPHEN DAVIDS, OF OAKLAND, CALIFORNIA.

BENT-LEVER SCALE.

SPECIFICATION forming part of Letters Patent No. 313,477, dated March 10, 1885.

Application filed June 21, 1884. (No model.)

*To all whom it may concern:*

Be it known that I, HENRY STEPHEN DAVIDS, of Oakland, Alameda county, State of California, have invented an Improved Weighing-Scale, of which the following is a specification.

My invention relates to those scales which are formed by suspending a thin metal plate from a fulcrum-pin upon one side of which the load is suspended from the plate and upon the other side the pendulous index-point, which, in maintaining its true perpendicular position, indicates the weight of the load upon a graduated arc struck from the pivotal-point of the pointer as the plate changes its adjustment in balancing the load. These scales have generally been used for weighing postal matter, and their capacity has been rather limited, and their nicety of measurement somewhat impaired by reason of the necessary closeness of the graded divisions of the scale, which followed from the plan of construction adopted. My design is intended to obviate the difficulty in this respect which has heretofore attended the operation of this class of scales.

In the accompanying drawings, forming part of this specification, Figure 1 is a side view of the scale in its position when unloaded. Fig. 2 is an edge view of its pendulous counter-balance. Fig. 3 is a side view of the scales loaded. Fig. 4 gives an edge view of the plate-chain.

In all the figures the same letters of reference represent the same parts.

A is a thin plate of metal, ordinarily about one-eighteenth of an inch thick. It is suspended by a ring and clevis at B, the fulcrum-point.

At C there is suspended from a pivot the link D, the left-hand edge of which lines with the graduation-marks of the scale, in the arc of which the length of the link is the radius. The scale is shown graduated along the edge with the scale $b$, which may be the same on both sides of the plate, so that the link D will register, to show the weight from either side of the plate.

At E the edge of the plate extends a gradually-increasing distance from the fulcrum-point upon a curved line, and upon this edge or horn of the plate the chain F is hung, being fastened at the top of the horn by the link G. At the other end of the link a common spring-clip, H, is suspended, which grips the weight I, although any other suitable means of supporting the weight may be adopted.

J is a stop-pin to prevent the link D from swinging off the plate. The links of the chain, as shown in Fig. 4, are joined by pins $a$, riveted on the ends, which have a diameter somewhat larger in the middle, so that there may be a shoulder to rivet against. By this means, also, the plates of the chain are kept an exact distance apart. As the links of the chain overlap the edge of the plate A it cannot, with ordinary usage, slip off.

The graduations of the plate may be avoirdupoise or troy weight, or of the decimal system.

By this plan of construction of these scales a large arc is traversed by the indicator, and the divisions may be made wide apart in graduating it. The addition of the horn at E, with its unwinding-chain suspending the clip which supports the load, compounds the effect of each adjustment—that is to say, when the weight of the load draws down the short arm of the lever, (the short arm being that part of plate A nearest the horn E and the long arm the other part,) not only does the long arm in swinging upward increase the distance horizontally between the point of suspension and the center of gravity on one side, but by reason of the unwinding of the chain from the horn E the center of gravity more speedily approaches the point of suspension upon the other until an equilibrium is established.

These scales may be held between thumb and finger, as shown; but to avoid all nervous vibration they may be hung on some steady permanent bracket—as, for instance, a hook driven in the wall. Their registrations will then be more accurately observed.

What I claim as my invention, and desire to secure by Letters Patent, is as follows:

1. The weighing-scale composed of a plate, A, provided with a circling graduated edge and with a suspension fulcrum-point at B, and having at one side of said fulcrum-point a horn, E, a suspending-support connected at one end to the plate and resting on said horn, to be wound and unwound thereon, and a pendulous indicator connected to said plate on the other side of the fulcrum-point and extending to the graduated scale, substantially as described.

2. In a weighing-scale, the combination, with a plate having scale-graduations thereon, and a fulcrum-point at B, and provided with a horn, E, to one side of the fulcrum-point, extending from one side of the plate, of a suspension-support to be wound and unwound upon said horn, and a pendulous bifurcated indicator pivoted to said graduated plate on the opposite side of the fulcrum-point, and lying opposite both sides of the plate, substantially as and for the purposes described.

3. In a weighing-scale, the combination, with a plate having a graduated scale thereon and a fulcrum-point at B, and provided with a horn, E, to one side of the fulcrum-point, extending from one side of the plate, of a suspension-chain to be wound and unwound on said horn and overlap the edges thereof, and a pendulous indicator pivoted to the said plate on the other side of the fulcrum-point, substantially as described.

HENRY STEPHEN DAVIDS.

Witnesses:
GEORGE PARDY,
F. T. NEWBERY.